United States Patent
Achour et al.

(10) Patent No.: US 8,507,034 B2
(45) Date of Patent: Aug. 13, 2013

(54) CONTROLLING TOP OF THE LINE CORROSION IN HYDROCARBON PIPELINES

(75) Inventors: Mohsen H. Achour, Bartlesville, OK (US); David J. Blumer, Bartlesville, OK (US); Thomas D. Baugh, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 161 days.

(21) Appl. No.: 12/792,149

(22) Filed: Jun. 2, 2010

(65) Prior Publication Data

US 2010/0304018 A1 Dec. 2, 2010

Related U.S. Application Data

(60) Provisional application No. 61/183,381, filed on Jun. 2, 2009.

(51) Int. Cl.
*B05D 7/22* (2006.01)

(52) U.S. Cl.
CPC .. *B05D 7/22* (2013.01); *B05D 7/222* (2013.01)
USPC ............................ 427/230; 427/235; 427/237

(58) Field of Classification Search
CPC ................................. B05D 7/22; B05D 7/222
USPC ............... 427/230–239, 243, 244; 166/309; 507/939; 118/DIG. 10, DIG. 13; 106/14.05, 106/14.26
See application file for complete search history.

(56) References Cited

U.S. PATENT DOCUMENTS

| 4,188,447 | A | * | 2/1980 | Ehlenz | 442/76 |
|---|---|---|---|---|---|
| 5,449,763 | A | * | 9/1995 | Wulff et al. | 424/49 |
| 6,841,125 | B1 | | 1/2005 | Chartier et al. | |
| 2006/0141637 | A1 | | 6/2006 | Hassell, Jr. | |
| 2007/0079963 | A1 | * | 4/2007 | Yang et al. | 166/270 |
| 2008/0257554 | A1 | * | 10/2008 | Zamora et al. | 166/309 |

FOREIGN PATENT DOCUMENTS

GB 2191841 12/1987

\* cited by examiner

*Primary Examiner* — William Phillip Fletcher, III
(74) *Attorney, Agent, or Firm* — ConocoPhillips Company

(57) ABSTRACT

Processes and methods are provided for applying corrosion inhibitor within a foam matrix to the top of the line of wet gas pipelines. The environment within a hydrocarbon containing pipeline may include fluids that form strong acids in the gas space at the upper portion of the pipeline and can rapidly corrode a carbon steel pipeline. The solution provides a foam matrix created by a combination of foaming agent, foaming gas and corrosion inhibitor that are each selected to be compatible with each other and with the hydrocarbon mixture to form a stable foam matrix that treats the top of the line position for the length of the pipeline. A foam breaking agent at the end of the pipeline can be injected, if needed.

7 Claims, 4 Drawing Sheets

_US 8,507,034 B2_

CONTROLLING TOP OF THE LINE CORROSION IN HYDROCARBON PIPELINES

CROSS-REFERENCE TO RELATED APPLICATIONS

This application is a non-provisional application which claims benefit under 35 U.S.C. §119(e) to U.S. Provisional Application Ser. No. 61/183,381 filed Jun. 2, 2009, entitled "Controlling Top of the Line Corrosion in Hydrocarbon Pipelines," which is incorporated herein in its entirety.

STATEMENT REGARDING FEDERALLY SPONSORED RESEARCH OR DEVELOPMENT

None.

FIELD OF THE INVENTION

This invention relates to the application of anticorrosion materials to the inside of hydrocarbon pipelines.

BACKGROUND OF THE INVENTION

Hydrocarbon pipelines constructed from carbon steel are vulnerable to corrosion, especially corrosion caused by organic acids and acid compounds of $H_2S$ and $CO_2$ dissolved in water. To prevent or avoid material loss from corrosion, it is common to inject corrosion inhibitors into the pipeline. However, the entire pipeline, including the very top of the line at the twelve o'clock position, is vulnerable to corrosion since the corrosion inhibitors tend to stay with the liquid at the bottom of the line. The gases at the top of the line include hydrocarbon gases, water vapor and the acidic components described above. Corrosion rates for untreated pipelines through the wall of the pipe may exceed 10 millimeters per year so corrosion mitigation is critical to economic and safe pipeline operation.

Any pipeline with stratified flow is particularly vulnerable to corrosion as the corrosion inhibitors typically remain concentrated in the liquid solution at the lower portion of the pipeline. Most hydrocarbon lines have stratified flow where liquids are at the bottom and gases are in the upper portions.

One technique for applying corrosion inhibitors is batch inhibition which consists of to periodically sending a device called a "pig" that approximately corresponds with the interior dimension of the pipe and includes circumferential grooves and other surface structures to apply the corrosion inhibitor chemicals to the full interior surface of the pipe. Unfortunately, batch inhibition using pigging can be expensive and many pipelines are designed or constructed in a manner that cannot be pigged. To the extent that a pipeline may have been designed to be amenable to pigging, a pig disrupts production through the pipeline, especially as it first enters the pipeline. In some circumstances, downstream processes are dependent upon continuous flow through the pipeline. For example, liquefied natural gas ("LNG") liquefaction plants are typically located near the shore where the liquefied natural gas may be loaded onto a LNG ship. The liquefaction plant may be remote and therefore will depend on a continuous flow of natural gas from the pipeline that carries the natural gas from the field. A potential interruption of the gas flow would create considerable costs as the plant is shut and restarted.

Pigs made of gelatin are an interesting alternative for pipelines that have tight turns or narrow passages along the length. However, gelatin materials are not suitable for warmer pipelines and do not necessarily assume the full diameter of the pipeline after a passing through a substantially smaller diameter valve or other restriction.

Corrosion resistant alloy materials have been used in hydrocarbon production facilities and pipe for years and will be effective in avoiding the dramatic corrosion rates that this invention is seeking to control. However, such corrosion resistant alloys are far more expensive than common carbon steel and are typically used in areas where it is impractical to apply corrosion inhibition.

SUMMARY OF THE INVENTION

The invention more particularly relates to a process for applying corrosion inhibitor to the top of the line (around the twelve o'clock position) inside a hydrocarbon pipeline carrying a hydrocarbon mixture where a corrosion inhibitor is delivered to the top of the line for the length of the pipeline. The process generally includes adding a foaming agent, a corrosion inhibitor and a foaming gas to the hydrocarbon pipeline where the foaming agent and corrosion inhibitor are chemically compatible with the hydrocarbon mixture to form a stable foam with a concentration of corrosion inhibitor carried in the foam to contact the top of the line within the pipeline and that maintains a stable volume of corrosion inhibitor carrying foam to continuously apply foam to the top of the line along the full extent of the pipeline. The process further includes adding a foam breaking agent to the pipeline at the end of the line to break the foam and render the solution comprising the hydrocarbon mixture, the foaming agent, the corrosion inhibitor, the foaming gas and the foam breaking agent as substantially non-foaming.

In one preferred aspect of the invention, the foaming gas is a hydrocarbon gas derived from a formation near the beginning end of the pipeline.

In another aspect the present invention relates to a process for applying a corrosion inhibiting solution to a pipeline carrying a live hydrocarbon solution where the corrosion inhibiting solution includes a foaming gas, a foaming agent, a corrosion inhibitor and a foam breaking agent where foam is formed in the pipeline that carries a concentration of corrosion inhibitor to the top of the line twelve o'clock position inside the pipeline while the pipeline is carrying the hydrocarbons and without interruption. The process for applying the solution generally includes a first step of analyzing hydrocarbons that are to be flowing in the pipeline and creating a test hydrocarbon solution for testing foaming agents, corrosion inhibitors and foam breaking agents. A number of foaming agents are tested with the test hydrocarbon solution to identify foaming agents that are effective at creating foam, and then the foaming agents that are effective in the test hydrocarbon solution are tested with a number of corrosion inhibitors in the test hydrocarbon solution to identify combinations of foaming agent and corrosion inhibitors that are most effective at maintaining adequate concentrations of corrosion inhibitor in the foam and sufficient foam quantity to apply foam to the twelve o'clock position in the pipeline for the full length of the pipeline. A number of foam breaking agents are tested to verify that the foam formed by the effective foaming agent in combination with the effective corrosion inhibitors in combination with the test hydrocarbon solution will be effectively stifled by one or more foam breaking agents. The process further includes identifying at least one cost effective combination of foaming agent, corrosion inhibitor, and foam breaking agent with the test hydrocarbon solution and testing the combination(s) of foaming agent, corrosion inhibitor, and foam breaking agent with live hydrocarbon solution in the pipeline and adjusting the injection rate of the foaming gas, the foaming agent and the corrosion inhibitor so that a concentration of corrosion inhibitor is applied to the top of the line twelve o'clock position along the length of the pipeline, and adequate foam breaking agent is provided at the end of the pipeline to prevent foaming of the hydrocarbon during subsequent processing thereof.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
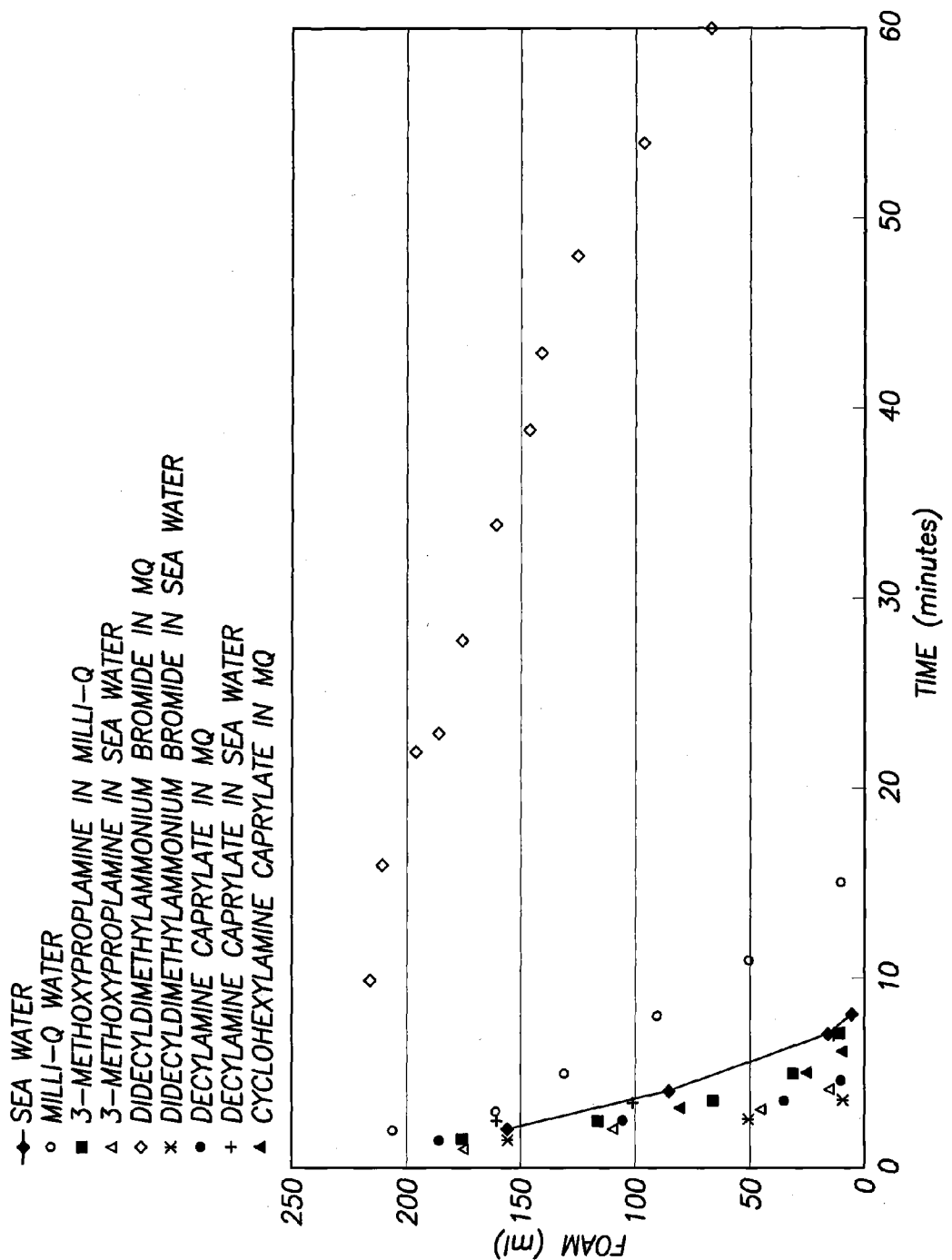
FIG. 1 is a chart indicating the volume of foam at various time intervals after the foaming gas flow has been stopped to estimate the duration that foam will remain in the pipeline with a first foaming agent in combination with a number of corrosion inhibitors.

Turning now to the preferred arrangement for the present invention, reference is made to the drawings to enable a more clear understanding of the invention. However, it is to be understood that the inventive features and concept may be manifested in other arrangements and that the scope of the invention is not limited to the embodiments described or illustrated. The scope of the invention is intended only to be limited by the scope of the claims that follow.

This invention is focused on reducing corrosion in hydrocarbon pipelines and especially at the top or twelve o'clock position with long pipelines. For example, in a natural gas well, other gases are produced along with methane, ethane, propane, butane, pentane, hexane and other hydrocarbons. Such other gases include water vapor, carbon dioxide and hydrogen sulfide and other known organic materials and impurities. As the natural gas is produced, it starts at the temperature of the formation from which it was produced. These temperatures are typically elevated compared to surface air temperatures and can be up to about 300° F. In the pipeline, the gases cool and some condense. Water condenses below 212° F. and hexane and propane are more commonly liquids at temperatures slightly higher than room temperature. As these gases cool because of a cold pipe wall from conduction, condensates are formed. A problem area for condensates is at the very top of the line, in the twelve o'clock position, where one or more corrosive condensates tend to form and cause a considerable corrosion risk to the pipeline.

In many cases, there is enough $H_2S$, $CO_2$ and organic acids in the gas space of the pipeline to create condensed fluids having a pH of as low as 3.0, which is very acidic. The acidic nature can cause rapid corrosion in a carbon steel pipeline and may cause catastrophic breaching of the pipeline within a few months.

So, to address the problem, the concept of the invention is to periodically or continuously inject a foam matrix carrying a corrosion inhibitor into the pipeline to mitigate top of the line corrosion. The selection of the foaming agent or surfactant, the foaming gas and the corrosion inhibitor is quite important. For example, focusing on the foaming gas, any oxygen containing gas, such as air, would not be acceptable considering that the pipeline is carrying hydrocarbons. The most preferred gas would be produced gases, most preferably hydrocarbon gases such as methane or ethane gases that are produced and collected at the well head as these are certainly compatible with other hydrocarbons (will not degrade or cause harm to the hydrocarbons) and is already at the wellhead and does not need to be purchased or shipped in. Nitrogen is the next most logical choice as it is inexpensive, commonly used in the oil field, generally available onsite, and inert. Carbon dioxide and oxygen are typically not preferred as the $CO_2$ is one of the causes of corrosion and oxygen is a safety hazard around the hydrocarbons.

The first step of the process for providing a corrosion inhibitor for a particular pipeline is to perform an analysis of the constituents of the hydrocarbon mixture that will be flowing in the pipeline during operation. The term "hydrocarbon mixture" in this sense includes the hydrocarbons, per se, along with water and the other impurities that are conveyed through the pipeline including gases that may be in the upper portion of the pipeline. The second step of the process is to create, in the lab or at a suitable test station, a test sample for predicting the suitability of a number of combinations of foaming agents and corrosion inhibitors along with foam breaking agents. While it is reasonable to ship samples of the hydrocarbon to the lab or test station, any dissolved gases and impurities are likely to have come out of solution by the time any predictive tests may be carried out. Thus, at the end of the process, extended live tests at the pipeline are necessary to confirm the efficacy of the proposed solutions, make changes or, more hopefully, introduce adjustments to the injection rates of the foaming agent and corrosion inhibitors.

Turning next to making foam, there are a number of known foaming agents that when mixed with water and provided with a bubbling foaming gas may create foam. Currently known foaming agents that have been tested are set forth in Table 1 below although it is foreseeable that new foaming agents may be created in the future:

TABLE 1

| Foaming Agent | Commercial Supplier |
| --- | --- |
| n-Decyl-N-N-Dimethylamine-N-Oxide | Anatrace |
| Sodium C14-16 Olefin Sulfonate | The Chemistry store |
| Dodecylbenzenesulfonic | Aldrich |
| HIW 85281 (dendtritic polymer) | Baker |
| Glucopon 215 UP | Cognis |
| Octlehoxylated alchol | BASF |
| Sodium Lauryl Ether Sulfate (Norfox SLES-70) | Norman Fox & Co. |
| FMW-235 | Baker |

However, each foaming agent will have a somewhat different performance when mixed with the hydrocarbon mixture that is flowing along the pipeline. The process of the present invention includes undertaking predictive tests with each available foaming agent with a lab created mixture of liquid that may include hydrocarbons, fresh or salt water and other impurities. Few foaming agents have been found NOT to create sufficient foam to justify further study. Those that are able to create a stable foam when mixed with the test liquid are then used in a second round of compatibility studies with corrosion inhibitors.

There is a number of known corrosion inhibitors for use with carbon steels that mitigate corrosion. For the present invention, the corrosion inhibitors are generally recognized to inhibit corrosion depending upon their concentration in the foam formed with the test liquid. Currently known corrosion inhibitors that have been used in testing are set forth in Table 2 below although, like foaming agents, new corrosion inhibitors are likely to be created in the future:

TABLE 2

| Corrosion Inhibitor | Commercial Supplier |
|---|---|
| Decylamine | Aldrich |
| Octylamine | Fluika |
| Cyclohexlamine | Aldrich |
| 3-Methoxyproplamine | Aldrich |
| Dicyclohexylamine | Aldrich |
| *Octanoic Acid 99% | Sigma |
| Corsicana OD-1(Imidzoline) | Corsicana Technologies Inc. |

Pursuant to the testing protocol of the present invention, it has been found that the foaming capability of foaming agents that were functional with the test liquids were altered such that more or less foam was measured as compared to the initial round of tests. Moreover, the corrosion inhibitor concentration in the foam was not predictable to the inventors in that the only way to determine which foams would appear to provide the most capability to provide substantial or sufficient concentrations of corrosion inhibiting chemicals was by actually performing the tests with the test liquids.

Figure 2:
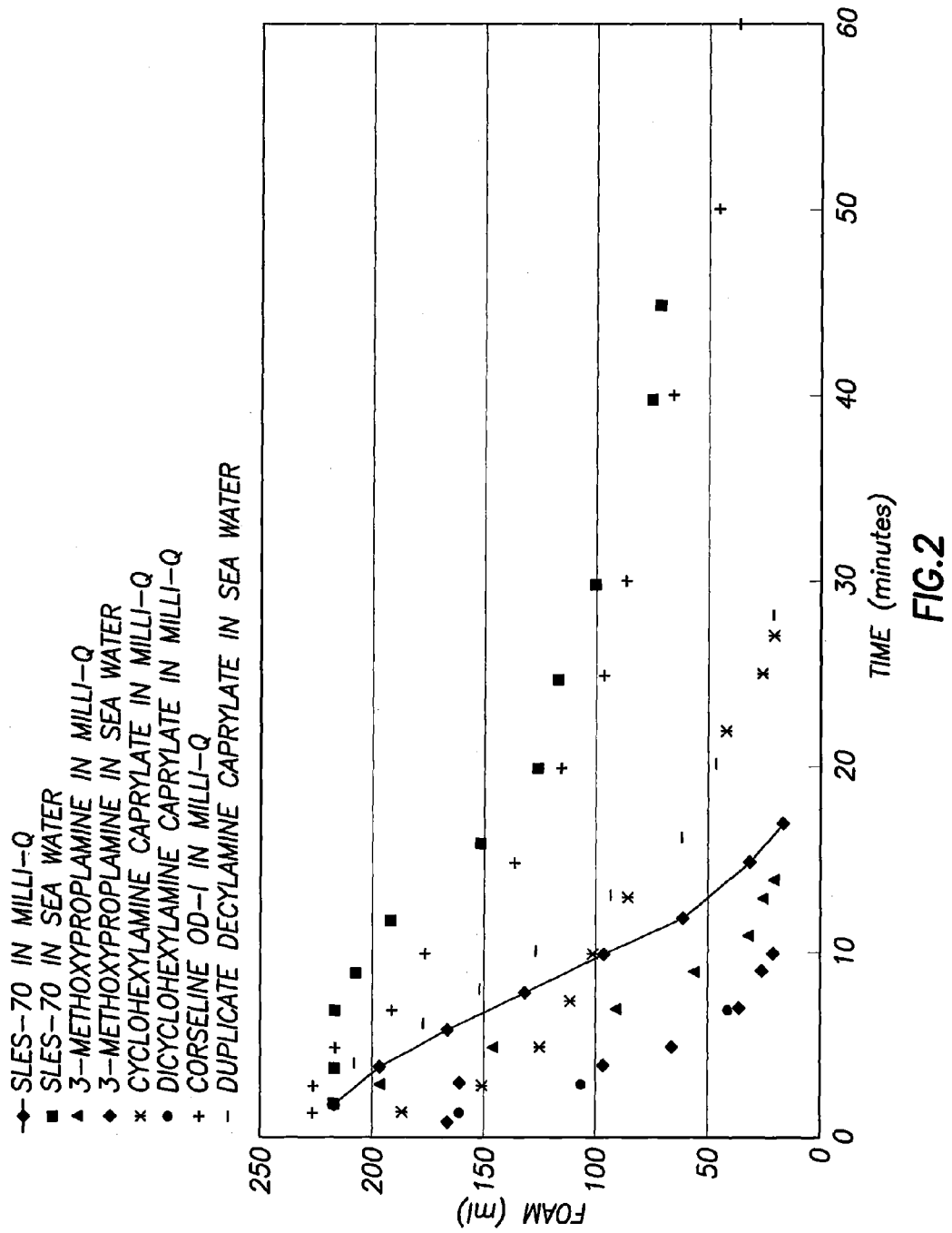
FIG. 2 is a second chart indicating the volume of foam at various time intervals after the gas flow has been stopped to estimate the duration that foam will remain in the pipeline with a second foaming agent in combination with a number of corrosion inhibitors.
Figure 3:
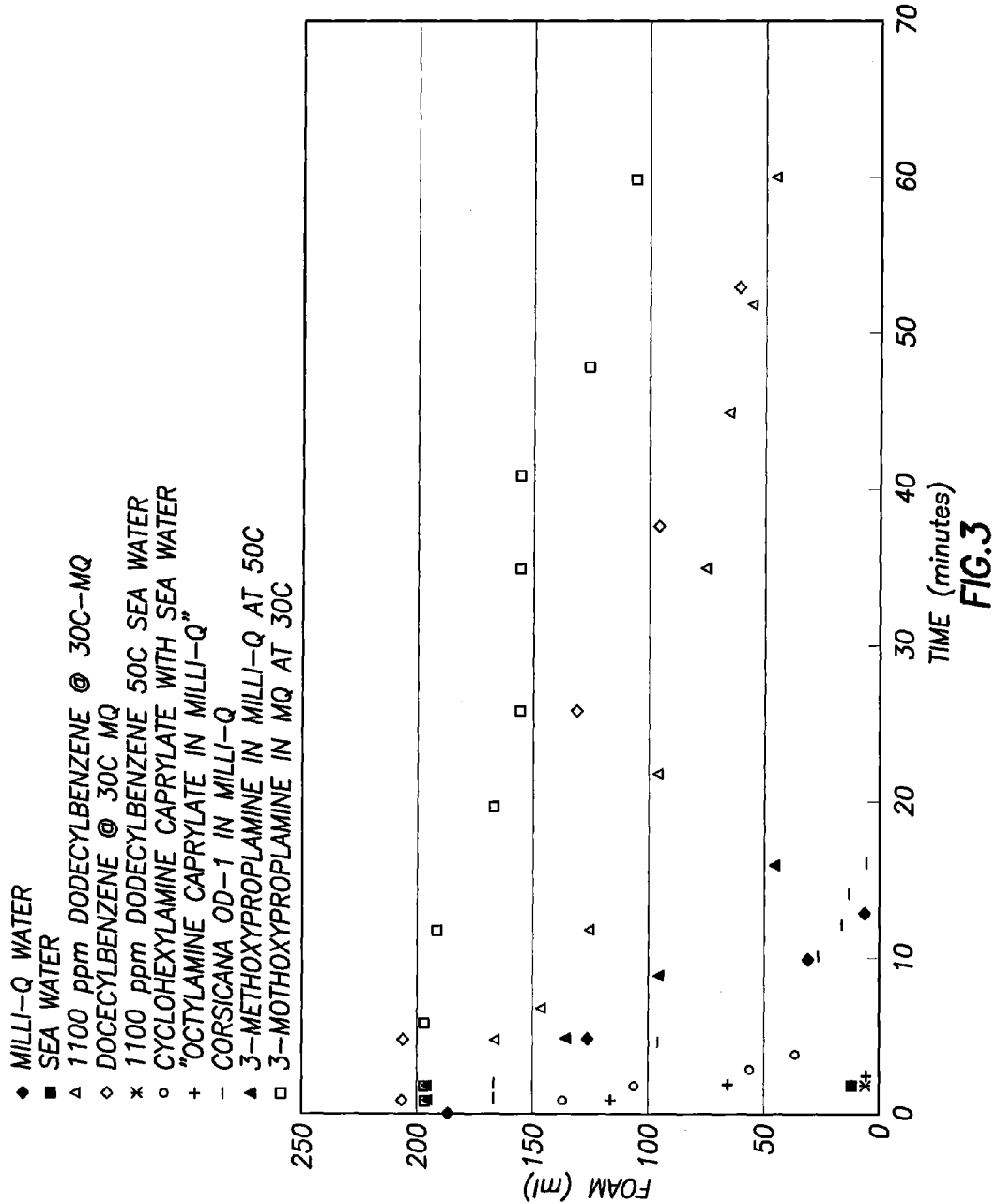
FIG. 3 is a third chart indicating the volume of foam at various time intervals after the gas flow has been stopped to estimate the duration that foam will remain in the pipeline with a second foaming agent in combination with a number of corrosion inhibitors.

A representative example of the measurements one might develop as part of the efficacy assessment of the foaming agent and corrosion inhibitor is shown in FIG. 1 where the clearly preferred choice for the hydrocarbons in the represented pipeline is HIW 85281 with didecyldimethylammonium bromide with distilled water. FIG. 2 provides a similar efficacy assessment where the foaming agent is SLES-70. One corrosion inhibitor performs better than the others and it is Corseline in distilled water. It is interesting to see that the foaming agent SLES-70 performs better with seawater than it does with distilled water, but the best corrosion inhibitor uses distilled water. This shows the unpredictability of these various components when mixed with hydrocarbons. FIG. 3 sets forth the performance of Foaming Agent Dodecylbenzene Sulfonic Acid with the various corrosion inhibitors. Several combinations show good performance where 3-Methoxyproplamine in de-ionized water.

Based on the concentration of the corrosion inhibiting materials in the foam and the volume of foam present after measured time durations, some initial calculations of how much foaming agent and corrosion inhibitors would provide adequate corrosion protection. Based on the likely amounts of foaming agent and corrosion inhibitor that would be used, cost estimates are prepared for each suitable combination. The most economic solution would clearly be preferred, although it should be recognized that the effectiveness of the most economic solution may be at least slightly different in the field. If a less economical alternative is substantially more capable of controlling corrosion, the cost of changing out the corrosion controlling solutions in the event that the most cost effective choice ends up being ineffective in a particular hydrocarbon solution in an active pipeline. For example, if the lowest cost solution comprises a foaming gas A1, a foaming agent B1, a corrosion inhibitor C1 along with a Foam breaking agent D1, and the second but more capable choice uses A1, B1 and D1 along with a second choice inhibitor C2, the cost of implementing this backup plan is more likely not very costly as compared with a backup plan that includes a second choice foaming agent B2 and a second choice foam breaking agent D2 where several changes need to be made. It should also be noted that the most cost effective solution may be the most capable solution and no second solution is readily apparent from the lab tests.

As noted above, the final step is actual field demonstration of the prime solution with observations and measurements of effectiveness. A delivery system for injecting the foam carried corrosion inhibitor is provided at the pipeline as described below with suitable adjustment capability to provide a preferred performance of the selected solution for the particular pipeline.

Figure 4:
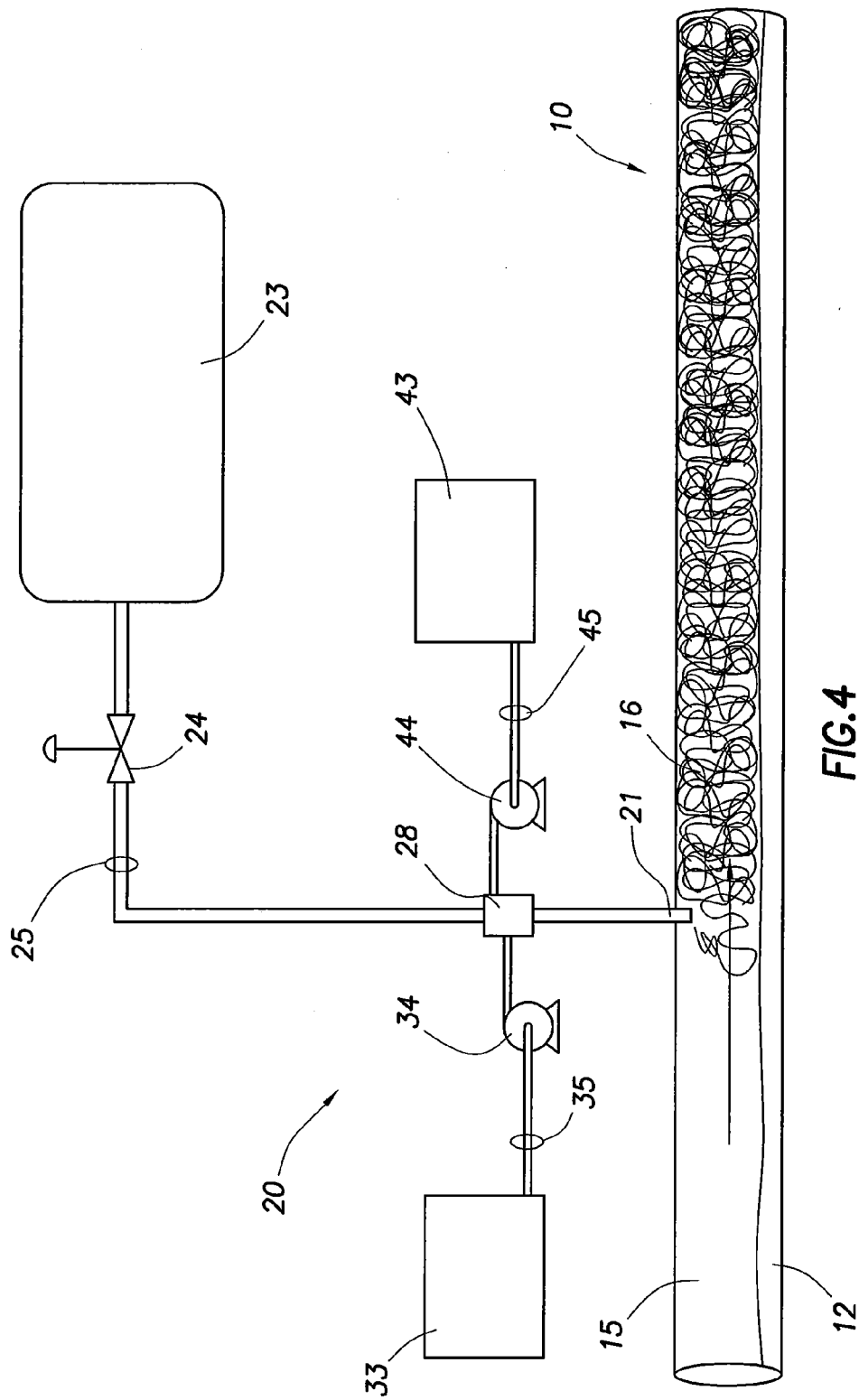
FIG. 4 is fragmentary perspective view of a pipeline and corrosion inhibitor injection system that delivers the foam carrying the corrosion inhibitor according to the present invention.

Turning to FIG. 4 of the present invention, a hydrocarbon pipeline carrying primarily gas is indicated with the number 10. The pipeline has liquid phase in the bottom as indicated by the number 12 and a gas space 15 above the liquid phase. The foam matrix, containing the corrosion inhibitor, is indicated by the arrow 20 and includes an injection nozzle 21 in the wall of the pipeline delivering foam matrix 16 into the gas space of the pipeline 10. Foaming gas is provided from a gas source such as tank 23 through control valve 24 and check valve 25 to a mixing device 28. Mixing device 28 is also provided with foaming agent or surfactant agent from a storage device 33 via pump 34 and check valve 35 and corrosion inhibitor from storage device 43 via pump 44 and check valve 45. Mixing device 28 preferably includes vanes or a tortuous path so that the three components are likely to form a relatively homogeneous blend. Injection nozzle 21 is preferably a converging/diverging nozzle which provides back pressure on the fluid flow so that foam may form when the pressure is let down on the diverging or expanding side of the nozzle. Alternatively, nozzle 21 may include a fritted filter to create numerous micro-bubbles to form foam. Optionally, other known bubbling technology may be employed to form the foam as the fluid enters the pipeline 10.

It should also be noted that storage device 33 includes water with the foaming agent and the two may be combined at the corrosion inhibiting system 20 or may be delivered premixed to the corrosion inhibiting system 20.

At the end of the pipeline, the foam must to be broken as the foaming agents can impact the clean separation of oil, water and gas during production. If foam does not naturally break, it can be broken by addition of an antifoam agent selected for its compatibility with the other components of the system.

The amounts of each of the foaming gas, foaming agent, corrosion inhibitor and foaming breaking agent may be independently adjusted to optimize performance for the pipeline 10. Such independent control may be accomplished by speed adjustments on the pumps, by control valves or other known flow regulating technology.

Finally, the scope of protection for this invention is not limited by the description set out above, but is only limited by the claims which follow. That scope of the invention is intended to include all equivalents of the subject matter of the claims. Each and every claim is incorporated into the specification as an embodiment of the present invention. Thus, the claims are part of the description and constitute a further description and are in addition to the preferred embodiments of the present invention. The discussion of any reference is not an admission that it is prior art to the present invention, especially any reference that may have a publication date after the priority date of this application.

The invention claimed is:

1. A process for applying corrosion inhibitor inside a hydrocarbon pipeline carrying a hydrocarbon mixture where a corrosion inhibitor is delivered to the gas space in the line for the length of the pipeline, the process comprising:
   a) adding a foaming agent, a corrosion inhibitor and a foaming gas to the hydrocarbon pipeline,
      wherein the foaming agent and corrosion inhibitor are chemically compatible with the hydrocarbon mixture to form a foam with a concentration of corrosion inhibitor carried in the foam to contact the top of the line within the pipeline and that maintains a volume of corrosion inhibitor carrying foam sufficient to continuously apply the foam to the top of the line along the full extent of the pipeline,
      wherein the foaming agent is selected from the group consisting of: alkylpolyglycoside, sodium olefin sulfonate, and sodium olefin sulfonate, and
      wherein the corrosion inhibitor is selected from the group consisting of: octylamine caprylate, a fatty acid imidazoline/amide, and decylamine caprylate; and
   b) adding a foam breaking agent to the pipeline at the end of the line to break the foam and render the foam substantially non-foaming to prevent foaming during subsequent processing thereof.

2. The process according to claim 1 wherein the foaming gas is a hydrocarbon gas derived from a formation near a beginning end of the pipeline.

3. The process according to claim 1 wherein the foaming gas is nitrogen.

4. The process according to claim 1 wherein the foam breaking agent is a non-ionic foam breaking agent.

5. The process according to claim 1, wherein the foaming agent is an alkylpolyglycoside, the foaming gas is nitrogen and the corrosion inhibitor is octylamine caprylate.

6. The process according to claim 1, wherein the foaming agent is sodium olefin sulfonate, the foaming gas is nitrogen and the corrosion inhibitor is a fatty acid imidazoline/amide.

7. The process according to claim 1, wherein the foaming agent is sodium olefin sulfonate, the foaming gas is nitrogen and the corrosion inhibitor is declamine caprylate.

* * * * *